United States Patent
Nakagawa

Patent Number: 5,982,388
Date of Patent: Nov. 9, 1999

[54] IMAGE PRESENTATION DEVICE WITH USER-INPUTTED ATTRIBUTE CHANGING PROCEDURES

[75] Inventor: Shigeo Nakagawa, Tokyo, Japan

[73] Assignee: NEC Corporation, Tokyo, Japan

[21] Appl. No.: 08/522,590

[22] Filed: Sep. 1, 1995

[30]     Foreign Application Priority Data

Sep. 1, 1994  [JP]  Japan .................................. 6-208633

[51] Int. Cl.$^6$ ................................................. G06T 17/00
[52] U.S. Cl. .......................................... 345/473; 345/433
[58] Field of Search ................................. 395/173, 133,
395/326; 707/501, 512, 526; 345/302, 433,
473, 121, 335, 339, 348

[56]             References Cited

U.S. PATENT DOCUMENTS

| 4,202,672 | 5/1980 | Nakamura et al. | 340/747 |
| 5,414,809 | 5/1995 | Hogan et al. | 395/326 |
| 5,420,968 | 5/1995 | Johri | 395/133 |

OTHER PUBLICATIONS

Foley et al., "Computer Graphics Principles and Practice Second Edition", Addison–Wesley, pp. 285–346, (1990).

*Primary Examiner*—Stephen S. Hong
*Attorney, Agent, or Firm*—Foley & Lardner

[57]             ABSTRACT

An image presentation device comprises an object information storage part which receives a scenario consisting of object information describing the attributes of an appearing object and an attribute changing procedure describing a procedure for changing the attributes of the appearing object and storing the object information contained in the scenario. An attribute changing procedure storage part receives the scenario and stores the attribute changing procedure contained in the scenario. An attribute changing part changes the attributes of the object information according to the attribute changing procedure. An object information calculating part calculates a position of the appearing object in a virtual space according to the object information whose attributes have been changed by the attribute changing part, an image generating part generates an image according to the calculated results by the object information calculating part.

22 Claims, 12 Drawing Sheets

| INDEX NO. | DISPLAY SELECTION | OBJECT NO. |
|---|---|---|
| ID-1 | YES | 1,2,3 |
| ID-2 | NO | 2,4,5 |
| ID-3 | YES | 1,5,6 |
| ⋮ | ⋮ | ⋮ |

IMAGE PRESENTATION DEVICE WITH USER-INPUTTED ATTRIBUTE CHANGING PROCEDURES

BACKGROUNDS OF THE INVENTION

1. Field of the Invention

This invention relates to an image presentation device for presenting an image by means of a computer, and particularly to an image presentation device which produces and presents an animation according to an interactive operation by a user.

2. Description of the Related Art

Systems which present an animation by an interactive operation using computer graphics (hereinafter referred to as CG) are known for various uses. For example, there is a system which generates three-dimensional CG images and moves a visual point and objects upon the input operation by a user, thereby presenting a walk-through animation where a visual point can be moved within a building. Another system shows on a display previously produced two-dimensional animation components and interactively presents a two-dimensional animation upon operations by a user with a mouse.

In such interactive animations, to switch the motion of an object on the scene according to the operations by the user, or to switch the presented state of an object on the scene by switching between display and non-display, multiple scene data, which contain the motions of appearing objects and the execution and non-execution of display, are previously provided as data described for each presented state, and these scene data are switched when the interactive animation is executed. And, scenario data, which describe the procedures for execution while successively switching the scene data and the alternatives for scene switching, are generated to execute the presentation of an animation.

These conventional types of image presentation device for presenting an interactive animation need to have scene data for each presented state when a scene has a plurality of presented states. Therefore, to designate the motion information of appearing objects common to individual scene data and to change the display and non-display, the designating and display changing operations are required to be repeated for all the plurality of scene data. And, they have a disadvantage that setting of a condition branch for the plurality of data is complicated. Consequently, there are disadvantages that significant labor is required for managing and editing the scenario data as the number of presented states increases, and productivity is lowered.

Furthermore, the conventional image presentation devices use scene data, in which presentation states are previously described, to present an animation and cannot change the scene data while executing. Thus, it is disadvantageous that a user cannot generate and execute a scene as he or she desires while executing the scenario and scenes cannot be developed freely.

The conventional image presentation devices describe a scenario for executing the motions in a large virtual space or a long scenario for successively executing short partial stories according to the progress of a story as a single large-scale and complicated scenario data. Therefore, switching information on the motion in a large space and switching of the motions according to the progress of a story are required to be described in single and complicated large-scale data for each appearing object, resulting in the increase of labors required for making a scenario.

It is also disadvantageous that a scenario cannot be made by two or more scenario creators because the scenario data is one.

SUMMARY OF THE INVENTION

A first object of the invention is to facilitate scenario data editing and making works by realizing a change to a plurality of presenting states by an operation to change into single data.

A second object of the invention is to provide means for generating presentation states according to a user's intention when executing a scenario to enable the development of a story freely.

A third object of the invention is to provide means for describing and executing a single scenario by a plurality of independent scenario data divided for, e.g., each partial space or partial story to reduce labors for making large-scale or complicated scenario data.

According to one aspect of the invention, an image presentation device includes:

object information storage means which receives a scenario consisting of object information describing the attributes of an appearing object and an attribute changing procedure describing a procedure for changing the attributes of the appearing object and storing the object information contained in the scenario.

The image presentation device further includes attribute changing procedure storage means which receives the scenario and stores the attribute changing procedure contained in the scenario.

The image presentation device also includes attribute changing means which changes the attributes of the object information according to the attribute changing procedure.

The image presentation device still further includes object information calculating means which calculates a position of the appearing object in a virtual space according to the object information whose attributes have been changed by the attribute changing means The image presentation device also includes image generating means which generates an image according to the calculated results by the object information calculating means.

In the preferred construction, the image presentation device further comprises attribute changing procedure renewing means which renews the attribute changing procedure stored in the attribute changing procedure storage means, according to the operations by a user, and object information renewing means which feeds back the calculated results by the object information calculating means to the object information storage means and renews the stored object information.

In the preferred construction, the image presentation device further comprises attribute changing procedure changing means, which changes the attribute changing procedure stored in the attribute changing procedure storage means, according to the calculated results by the object information calculating means.

Also, the object information contains a geometric attribute describing information on a shape of at least each appearing object, a motion attribute describing information on the motion of the appearing object, and a display attribute describing information on the display state of the appearing object, and the display attribute contains as state variables at least a presentation flag indicating a difference between visible and invisible states, information indicating which one of a plurality of motions is to be executed, and information indicating a position of the appearing object in the virtual space.

In the preferred construction, the image presentation device further comprises attribute changing procedure changing means, which changes the attribute changing procedure stored in the attribute changing procedure storage means, according to the calculated results by the object information calculating means, and transition scenario storage means for receiving and storing a transition scenario which describes a combination of partial scenarios and link information among the partial scenarios, then outputting the partial scenarios according to the execution state of the scenario to the object information storage means and the attribute changing procedure storage means.

Also, the object information contains a geometric attribute describing information on a shape of at least each appearing object, a motion attribute describing information on the motion of the appearing object, and a display attribute describing information on the display state of the appearing object, and the display attribute contains as state variables at least a presentation flag indicating a difference between visible and invisible states, information indicating which one of a plurality of motions is to be executed, and information indicating a position of the appearing object in the virtual space.

According to another aspect of the invention, an image presentation device includes:

object information storage means which receives a scenario consisting of object information connecting a plurality of appearing objects into a hierarchical graph structure and describing the attributes of the appearing objects and an attribute changing procedure describing a procedure for changing the attributes of the appearing objects and storing the object information contained in the scenario.

The image presentation device further includes attribute changing procedure storage means which receives the scenario and stores the attribute changing procedure contained in the scenario.

The image presentation device also includes partial graph specifying means which specifies a desired partial graph from the object information according to the object information and the attribute changing procedure.

The image presentation device still further includes partial graph changing means which changes the attributes of the object information shown in the specified partial graph according to the attribute changing procedure.

The image presentation device also includes object information calculating means which calculates a position of the appearing object in a virtual space according to the object information whose attributes have been changed by the attribute changing means, The image presentation device further includes image generating means which generates an image according to the calculated results by the object information calculating means.

In the above-mentioned construction, the image presentation device further comprises attribute changing procedure renewing means which renews the attribute changing procedure stored in the attribute changing procedure storage means, according to the operations by a user, and object information renewing means which feeds back the calculated results by the object information calculating means to the object information storage means and renews the stored object information.

In the above-mentioned construction, the image presentation device further comprises attribute changing procedure changing means, which changes the attribute changing procedure stored in the attribute changing procedure storage means, according to the calculated results by the object information calculating means.

In the above-mentioned construction, the image presentation device further comprises attribute changing procedure changing means, which changes the attribute changing procedure stored in the attribute changing procedure storage means, according to the calculated results by the object information calculating means, and transition scenario storage means for receiving and storing a transition scenario which describes a combination of partial scenarios and link information among the partial scenarios, then outputting the partial scenarios according to the execution state of the scenario to the object information storage means and the attribute changing procedure storage means.

Also, the object information contains a geometric attribute describing information on a shape of at least each appearing object, a motion attribute describing information on the motion of the appearing object, and a display attribute describing information on the display state of the appearing object. The display attribute contains as state variables at least a presentation flag indicating a difference between visible and invisible states, information indicating which one of a plurality of motions is to be executed, and information indicating a position of the appearing object in the virtual space.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENTS

Figure 1:
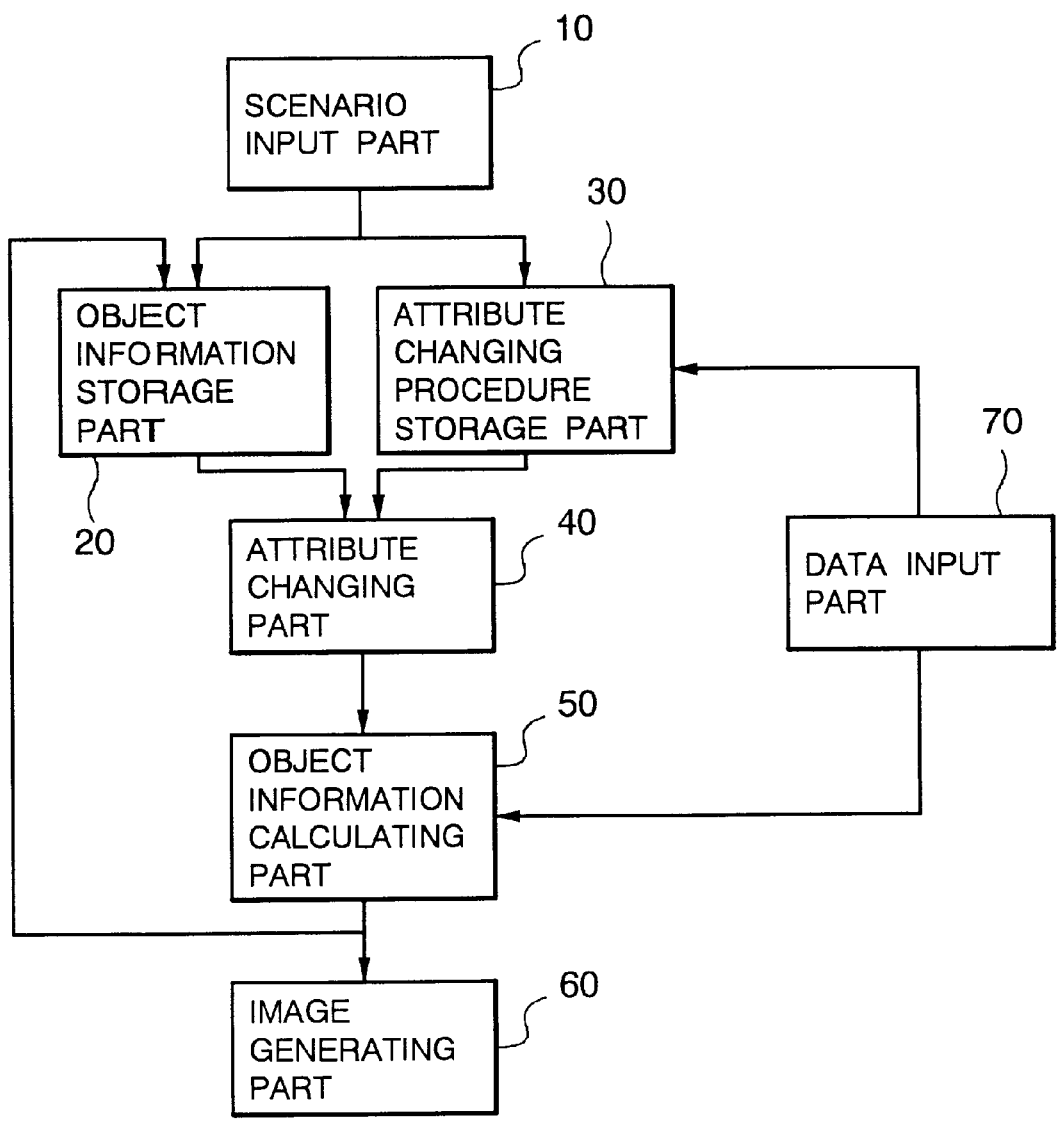
FIG. 1 is a block diagram showing the structure of the first embodiment of the invention.

Preferred embodiments of the invention will be described in detail with reference to the attached drawings. FIG. 1 is a block diagram showing the structure of an image presentation device according to the first embodiment of the invention.

This embodiment will be described in connection with the generation of images by three-dimensional CG but can also be applied to the generation of images by using two-dimensional animation components employing two-dimensional images instead of the three-dimensional ones.

As shown, the image presentation device of this embodiment comprises a scenario input part 10 for entering a scenario, an object information storage part 20 and an attribute changing procedure storage part 30 for storing the entered scenario, an attribute changing part 40 for changing attributes according to the information stored in the object information storage part 20 and the attribute changing procedure storage part 30, an object information calculating part 50 for calculating the position of an object in a virtual space, an image generating part 60 for generating images according to the information processed in each part, and a data input part 70 for entering data by an interactive operation with a user.

The scenario input part 10 is an input device such as a keyboard and enters a scenario consisting of object information and attribute changing procedures to be described afterward, then sends the scenario to the object information storage part 20 and the attribute changing procedure storage part 30.

Figures 2, 3:
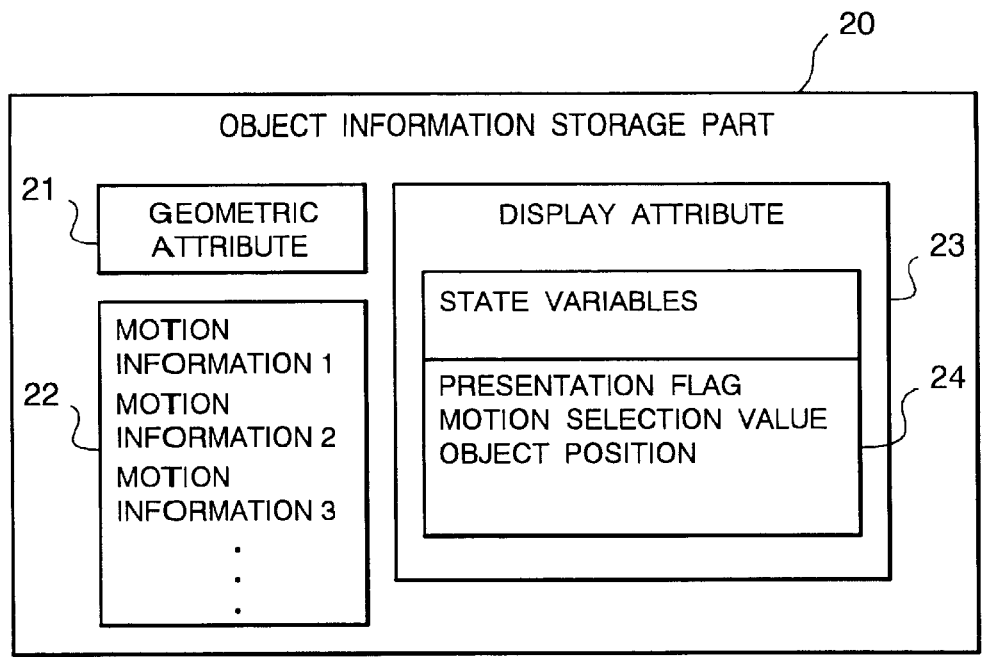
FIG. 2 is a diagram showing a structural example of object information used in the above embodiment.
FIG. 3 is a diagram showing an example of the object presentation group list used in the above embodiment.

The object information storage part 20 is a storage device such as a magnetic disk unit and stores the object information from the scenario sent from the scenario input part 10. FIG. 2 shows a structural example of the object information. The object information is described for each appearing object to be presented as an image and consists of a geometric attribute 21, a motion attribute 22 and a display attribute 23.

The geometric attribute 21 describes object shape and shape surface information for each appearing object. These pieces of information can be described according to shape data in an object coordinate system, surface characteristics such as a color intensity value and a reflection coefficient, a texture image for texture mapping, and a corresponding relation between the texture image and the object surface.

The motion attribute 22 describes motion information, which defines a corresponding relation between an object-belonging coordinate system and its high-order coordinate system with the passage of time, for each appearing object. The motion information can be described in various types. For example, motion information $M(t1), M(t2), \ldots, M(tn)$ of sampled objects can be described by recording a homogeneous coordinate matrix M for effecting translation, rotation, scaling (extension, contraction) and their combination of the object coordinate system on the high-order coordinate system in the order of times $t1, t2, \ldots, tn$ for each frame. As frame time, by using, for example, a field time 1/60 second or a frame time 1/30 second for TV broadcasting (NTSC method) 1, smooth animation images can be generated. And, when a function D using time t as a parameter can define a corresponding relation D(t) which is equivalent to the homogeneous coordinate matrix at the time t, a combination of the function D and the parameter t can be used as the motion information of an object. For example, the object motion may be described by a spline curve and a parameter showing a position on the curve.

For each appearing object, a plurality of information are determined as the corresponding motion attribute 22, and the motion information to be used according to the display attribute to be described afterward is selected.

To the motion information, voice or music information may be additionally described in addition to the motion of the object in the space. As the voice information, digital voice information recorded by the PCM recording method which is used for compact disks can be used. The recorded voice information is reproduced in synchronization with the motion of the object when the images are generated.

The display attribute 23 is set a plurality of state variables 24 containing at least a presentation flag for selecting a presentation state of an appearing object, a motion selection value for defining the selected motion information, and the position of the appearing object in the space. The state variables 24 can be given initial values in advance.

The presentation flag selects the presentation state of the appearing object. For instance, when the presentation flag is set, the applicable appearing object is visually displayed when an image is created, and when the presentation flag is reset, the applicable appearing object is not visually displayed.

The motion selection value defines the selected motion information. For example, when the appearing object has a plurality of selectable motion information as the motion attribute 22, one of the plurality of motion information which are set by determining the motion selection value is selected.

The position of an object in the space stores a rotation angle and a position coordinate in the high-order coordinate system of an appearing object. This position information is used for determining a position of the applicable appearing object when the image is created.

In addition to the above attributes, an attribute value which characterizes the creation of an image according to the object information can set an arbitrary attribute value as a display attribute. Attributes such as positions and directions of a visual point and a light source positioned in the space are also treated as appearing objects and the above various attributes are set.

The attribute changing procedure storage part 30 is a storage device such as a magnetic disk unit, and stores an attribute changing procedure from the scenario sent from the scenario input part 10. The attribute changing procedure is an aggregate of a plurality of functions or procedures previously determined to change each attribute of the appearing objects stored in the object information storage part 20. To change the attributes, the designation of executing or not executing of each procedure and the designation of object information which is subject to changes of arguments and attributes of the procedure are specified as parameters. And, the attribute changing procedure storage part 30 can be renewed by input data entered from the data input part 70. When data for renewing the attribute changing procedure is entered, the attribute changing procedure (hereinafter referred to as the applicable attribute changing procedure) to be executed with respect to object information is calculated according to the input data and outputted to the attribute changing part 40.

A method to calculate the applicable attribute changing procedure will be described with reference to a case that a presentation flag of the display attribute is set with respect to an aggregate of specific objects in the object information. In this case, as the attribute changing procedure, a user specifies a display group with respect to an object display group list which manages the display and non-display of the objects according to the object numbers. The objects are previously given unique object numbers for identification.

FIG. 3 shows one example of the object display group list. In FIG. 3, an object display group list stores data of an index number 31, a display selection 32 and an object number 33. In the drawing, an index ID-1 and an index ID-3 are selected for display. Therefore, the presentation flag of objects 1, 2, 3, 5 and 6 which is a union of object numbers belonging to the index ID-1 and the index ID-3 is set. And, the presentation flag of other objects is reset. The attribute changing procedure storage part 30 presents to a user the object display group list shown in FIG. 3, and the user enters YES or NO with respect to display selection items of the list to select the display of objects for each display group.

The process of presenting the object display group list to the user to let him or her select items may be executed by the attribute changing procedure storage part 30 which temporarily calculates a special attribute changing procedure of displaying the list and an item selection cursor and outputs. In this case, the user can operate the mouse and the keyboard to move the item selection cursor in the created image to choose an object in the image, thereby selecting an item.

As a result of the above designation of the attribute changing procedure, only a specific object is created into the image. For example, from an aggregate of components configuring a complex machine, specific components which are generally not visible in the machine can be presented. And, as to the functions concerning other display attributes of the object information, the attribute changing procedure can be calculated by presenting the object information group list to select items and input data as described above. For example, when the same selection procedure is applied to the motion selection value of the display attribute 23 shown in FIG. 2, the above presentation of the components within the machine can be made while switching the motions when such components have different motions.

The renewal of the applicable attribute changing procedure is not required to be made for each frame. And, when renewal is not made, the attribute changing procedure described in the scenario entered from the scenario input part. 10 is outputted as the applicable attribute changing procedure to the attribute changing part 40.

To execute the designated functions by the attribute changing procedure, a plurality of attribute changing procedures may be stored in the attribute changing procedure storage part 30, and respective attribute changing procedures may be executed successively according to the input data entered from the data input part 70. And, according to the input data, an attribute changing procedure may be selected at the time of execution.

And, the attribute changing procedure can be described to correspond to each appearing object to be executed at a ratio of 1:1. When a scenario is described as an aggregate of part data combining the object information and the attribute changing procedure for each appearing object, the part data for each appearing object can be registered or deleted, facilitating scenario editing and creating works.

The attribute changing part 40 is a program-controlled CPU or the like, and successively executes the function specified to be executed by the applicable attribute changing procedure sent from the attribute changing procedure storage part 30, with respect to the object information from the object information storage part 20. Thus, each attribute of the object information is changed. After completely executing all functions, the attribute changing part 40 outputs the changed object information to the object information calculating part 50.

The object information calculating part 50 is a program-controlled CPU or the like, and calculates the position of an object in the space for each frame according to the changed object information sent from the attribute changing part 40 and the input data entered from the data input part 70.

The position of an object in the space can be calculated by selecting motion information for each object from the motion selection value described, for example, as the display attribute 23 of the object information, determining a change of a relative position after the lapse of a frame time, and adding the obtained positional change to the position of the object with the display attribute on the high-order coordinates. And, the position of the object in the space may be calculated according to the input data from the data input part 70. For instance, the user can operate to change the motion of the object which the user is watching, enabling to realize an operation that the visual point is moved freely within a building.

As described above, the result obtained by calculating the display attributes containing the position coordinates of the object is outputted as the final object information to the image generating part 60. And, the object information stored in the object information storage part 20 is renewed according to the final object information.

The image generating part 60 is a program-controlled CPU or the like, and generates images according to the final object information sent from the object information calculating part 50 and continuously presents them as a series of pictures on a display device (not shown). And, when voice information is set as the object information, the voice information which is recorded in synchronization with the motion of the object in the image is reproduced. The image generating part 60, according to the geometric attribute of each object and the positions of the objects in the space with the display attribute of the object information containing a visual point and a light source, makes for each frame time a series of image generating treatments such as a coordinate change, clipping, brightness calculation, see-through projection calculation, hidden side erasing processing and others to present as an image on a display device (not shown). At this time, an object, which is set a presentation flag which is a state variable of the display attribute 23 of the object information, is generated into the image as a visible object, and an object which is reset a presentation flag is not generated into the image as being determined as a transparent object having an invisible attribute.

The data input part 70 is an input device such as a keyboard and a mouse, and operated by a user to enter input data and output to the attribute changing procedure storage part 30 and the object information calculating part 50. Available input data includes data previously recorded on a storage medium such as a magnetic disk or a magnetic tape, communication data inputted through a network, and data such as calculated results according to another data preparing program. As described above, this embodiment can create scene data one by one to produce an image by describing a scenario by a combination of object information and attribute changing procedure and applying the attribute changing procedure to the object information when executing the scenario. And, to generate a plurality of presentation states based on a single piece of information, e.g., to make changes to the object information when creating the scenario, the changes can be automatically reflected on all scene data. And, when the user specifies subject designation information of an object which is subject to the attribute change to change the attribute changing procedure, presentation states can be generated one by one and presented according to the user's will.

Figure 4:
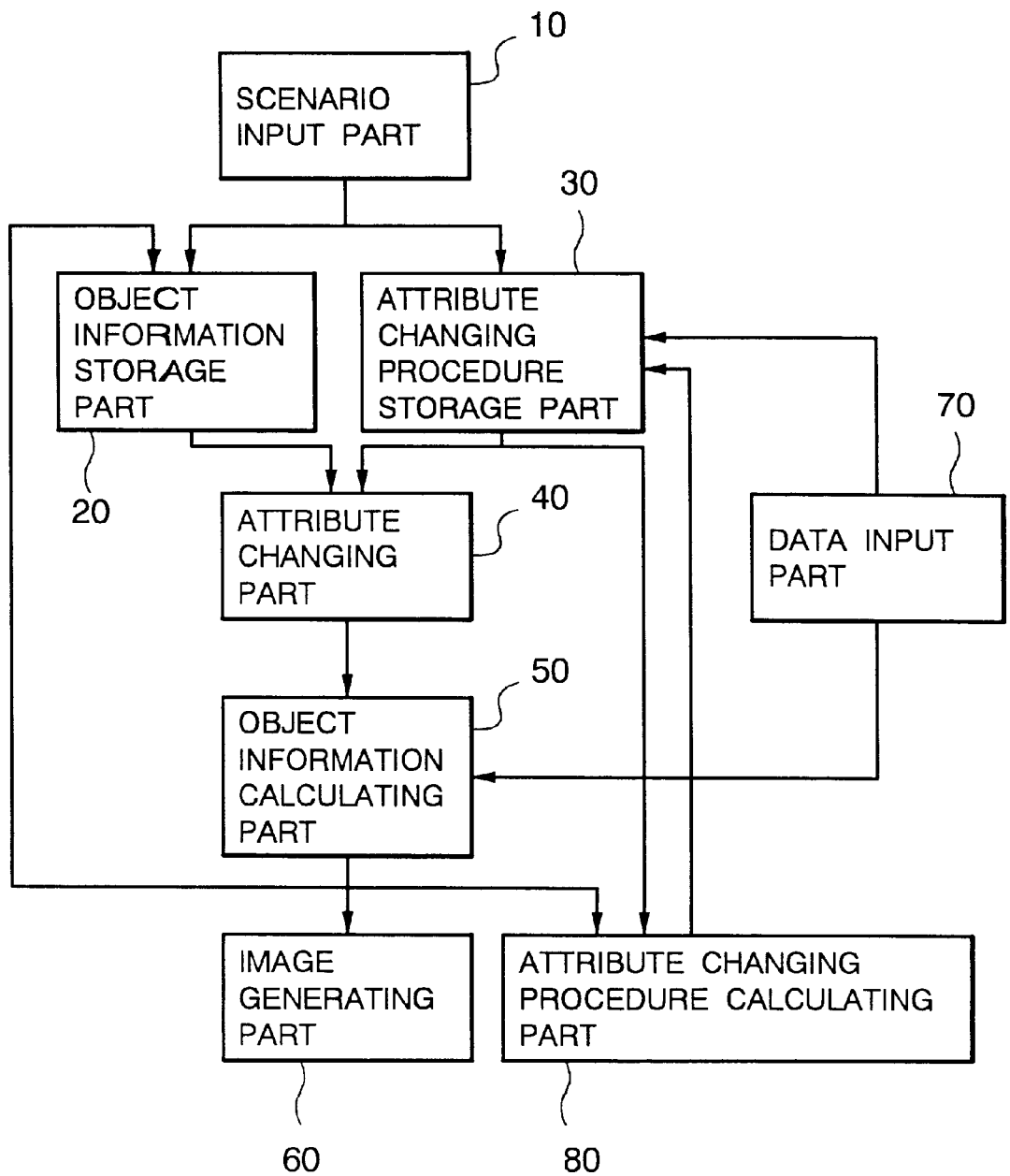
FIG. 4 is a block diagram showing the structure of the second embodiment of the invention.

FIG. 4 is a block diagram showing the structure of an image presentation device according to the second embodiment of the invention.

As shown, the image presentation device of this embodiment is configured by adding an attribute changing procedure calculating part 80 to the structure of the first embodiment shown in FIG. 1. For other elements, the same reference numerals are assigned in the same way as in the first embodiment, and their descriptions will be omitted.

The attribute changing procedure calculating part 80 makes changing calculation according to the final object information calculated by the object information calculating part 50, with respect to the applicable attribute changing procedure calculated by the attribute changing procedure storage part 30. The changed attribute changing procedure calculated by the attribute changing procedure calculating part 80 is sent to the attribute changing procedure storage part 30. The attribute changing procedure storage part 30 renews the stored attribute changing procedure according to the entered changed attribute changing procedure.

The operation of the attribute changing procedure calculating part 80 will be described referring to a case that available attribute changing procedure types are changed according to a positional change of a visual point in the space. For instance, a function A is made applicable as the attribute changing procedure to an object in a space A, while a function B is made applicable in an adjacent space B.

In this case, with respect to each function in the attribute changing procedure, a range in the space to which the function can be applied is previously described. And, the position of a visual point described in the final object information outputted from the object information calculating part 50 is compared with the range to which the function can be applied to determine whether the function is applied to each function. As a result, the functions whose visual point position falls in the applied range are determined to be applicable and registered in the attribute changing procedure, and the functions whose visual point position does not fall in the applied range are not registered in the attribute changing procedure.

The above case has calculated the applicability and non-applicability of the functions, but the attribute changing procedure calculating part 80 can also calculate to change into an arbitrary attribute changing procedure such as a change in used parameter value of a function.

Thus, according to the final object information outputted from the object information calculating part 50, the attribute changing procedure is automatically changed, so that the presentation method of the object can be selected according to each scene of the scenario.

Figure 5:
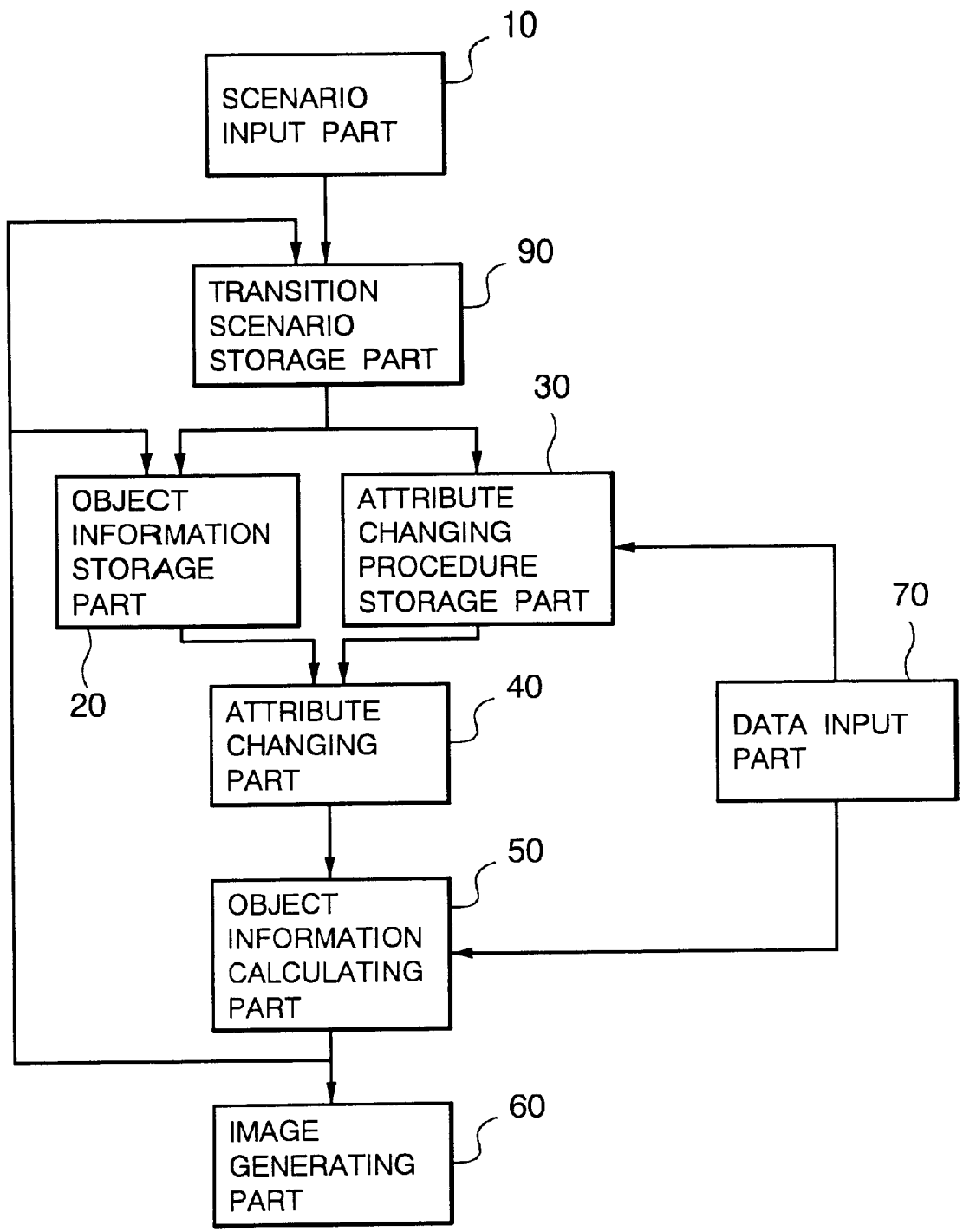
FIG. 5 is a block diagram showing the structure of the third embodiment of the invention.

FIG. 5 is a block diagram showing the structure of an image presentation device according to the third embodiment.

As shown, the image presentation device of this embodiment has a transition scenario storage part 90 added to the structure of the first embodiment shown in FIG. 1. For other elements, the same reference numerals are assigned in the same way as in the first embodiment, and their descriptions will be omitted.

The transition scenario storage part 90 consists of a program-controlled CPU and a storage device such as a magnetic disk unit, and receives and stores a transition scenario which describes a combination of partial scenarios and link information among the partial scenarios, then outputs to the object information storage part 20 and the attribute changing procedure storage part 30.

The transition scenario consists of the partial scenarios which are described in split pieces for each scene of a progressing story or for partial spaces forming a space, and the link information which describes transition conditions among these multiple partial scenarios and a destination for transition.

Figure 6:
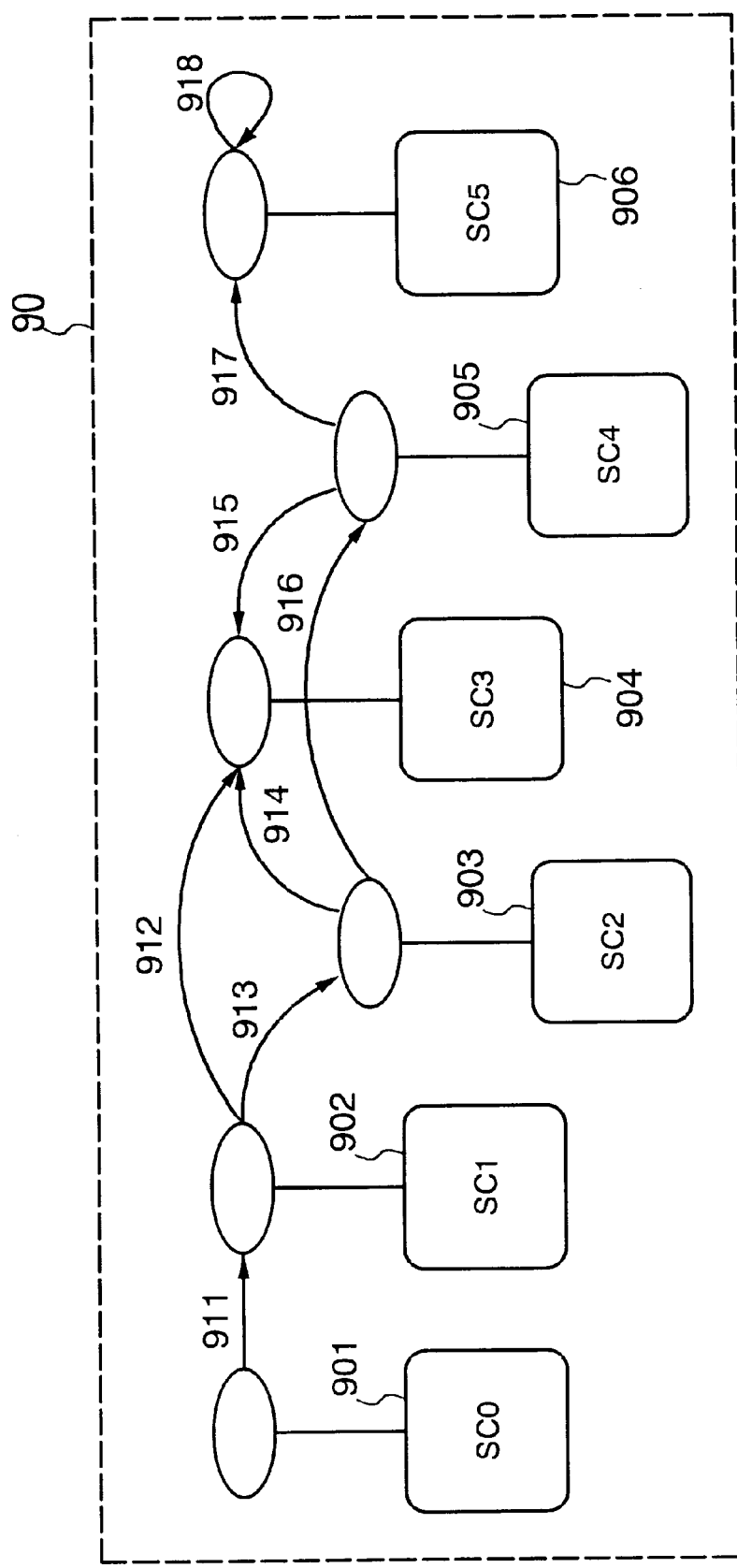
FIG. 6 is a diagram showing a structural example of the transition scenario used in the above embodiment.

FIG. 6 is a diagram showing the structure of a transition scenario of this embodiment. As shown, a large-scale transition scenario 901 is described in the form of a plurality of partial scenarios 901–906. And, when an image is presented, the partial scenarios are switched according to the designation by the user. The partial scenarios to be executed are decided by sequentially following transition link information 911–918 which designate the previously determined transition conditions among the partial scenarios and the destination for transition, according to the designation by the user. The partial scenario to be executed first is previously determined as, e.g., an initial state scenario 901.

From the scenario input part 10, the transition scenario is entered in the same way as the ordinary scenario shown in the first and second embodiments.

The transition scenario storage part 90 traces the link information according to a scenario selection request outputted when the object information calculating part 50 changes a scenario to be executed, selects one partial scenario, and outputs it as an execution scenario to the object information storage part 20 and the attribute changing procedure storage part 30.

Transition of the scenario is made as follows. First, every time a scenario selection request is entered into the transition scenario storage part 90, the transition scenario storage part 90 examines a transition link which is moving from the partial scenario outputted as the execution scenario to another partial scenario to find out whether the scenario selection request meets the transition conditions of each transition link. Then, when it does, the partial scenario at the destination of the transition link is outputted as a new execution scenario.

Every time the execution scenario is outputted, the object information storage part 20 and the attribute changing procedure storage part 30 each renew the contents according to the object information of execution scenario and the attribute changing procedure.

According to the scenario execution results, as one example of the scenario selection request generated by the object information calculating part 50, the position and moving direction of a specific object on the high-order coordinate can be used as parameters to generate the scenario selection request for each frame. When a user operates to move a visual point in the space, if the visual point goes out of the previously determined area in the scenario, the scenario selection request can be generated automatically with the position and moving direction of the visual point on the high-order coordinate as parameters. Furthermore, the scenario selection request can also be generated directly by using the name or No. of the partial scenario to be executed next by the user.

By sequentially switching the partial scenarios associated with the executed results of the scenario as described above, the large-scale transition scenario consisting of the partial scenarios can be executed.

Figure 7:
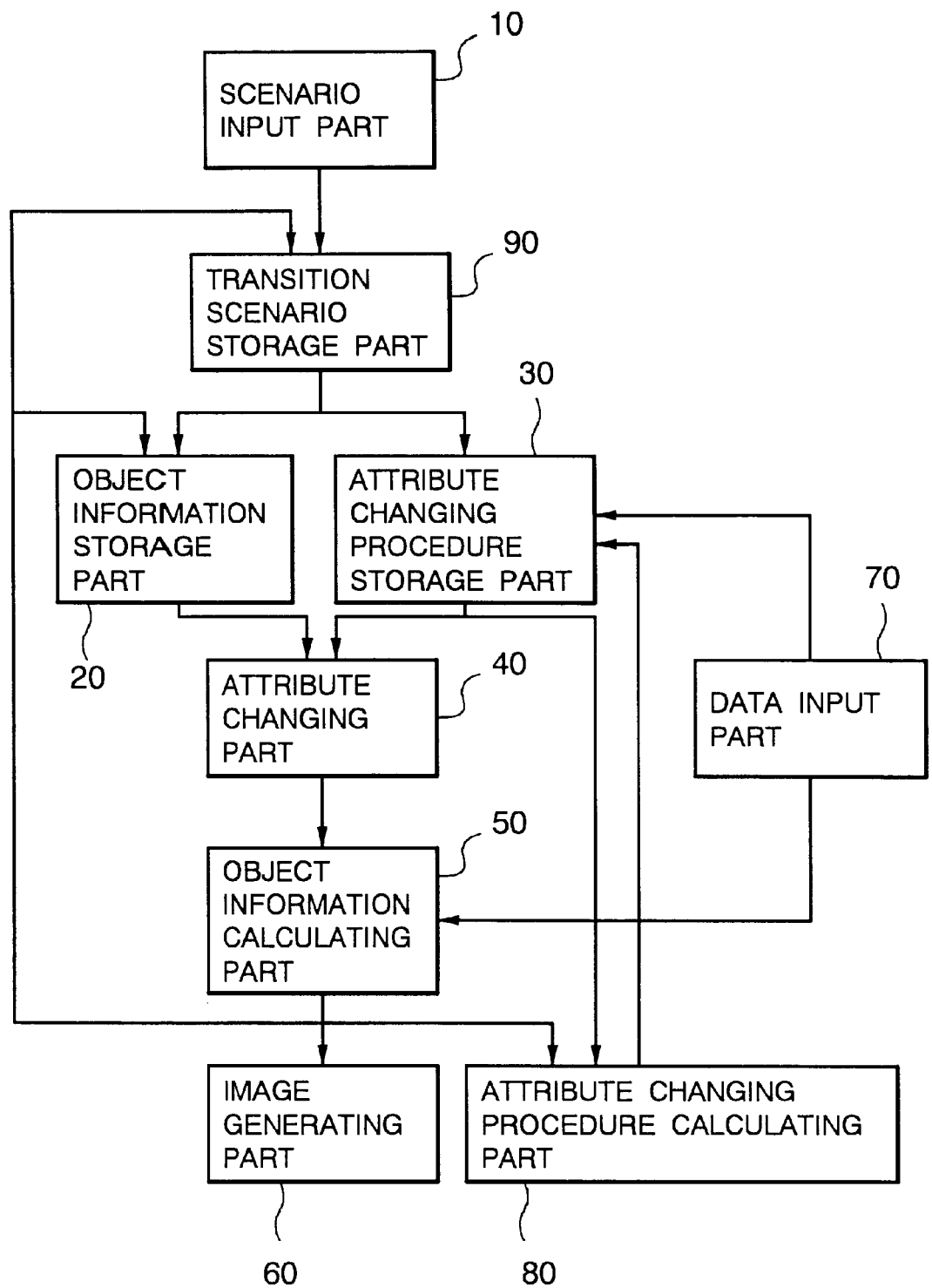
FIG. 7 is a block diagram showing the structure of the fourth embodiment of the invention.

FIG. 7 is a block diagram showing the structure of an image presentation device according to the fourth embodiment of the invention.

As shown, the image presentation device of this embodiment has an attribute changing procedure calculating part 80 and a transition scenario storage part 90 added to the structure of the first embodiment shown in FIG. 1. The attribute changing procedure calculating part 80 is the same as the one in the second embodiment shown in FIG. 4. And, the transition scenario storage part 90 is the same as the one in the third embodiment shown in FIG. 5. For other elements, the same reference numerals are assigned in the same way as in the first embodiment, and their descriptions will be omitted.

By virtue of the attribute changing procedure calculating part 80, this embodiment can automatically change the attribute changing procedure according to the final object information from the object information calculating part 50, and can select an object presentation method according to a scene of the scenario.

Storage of the transition scenario entered into the transition scenario storage part 90 and sequential switching of the partial scenarios associated with the executed results of the scenario allow to execute a large-scale transition scenario consisting of partial scenarios.

Figure 8:
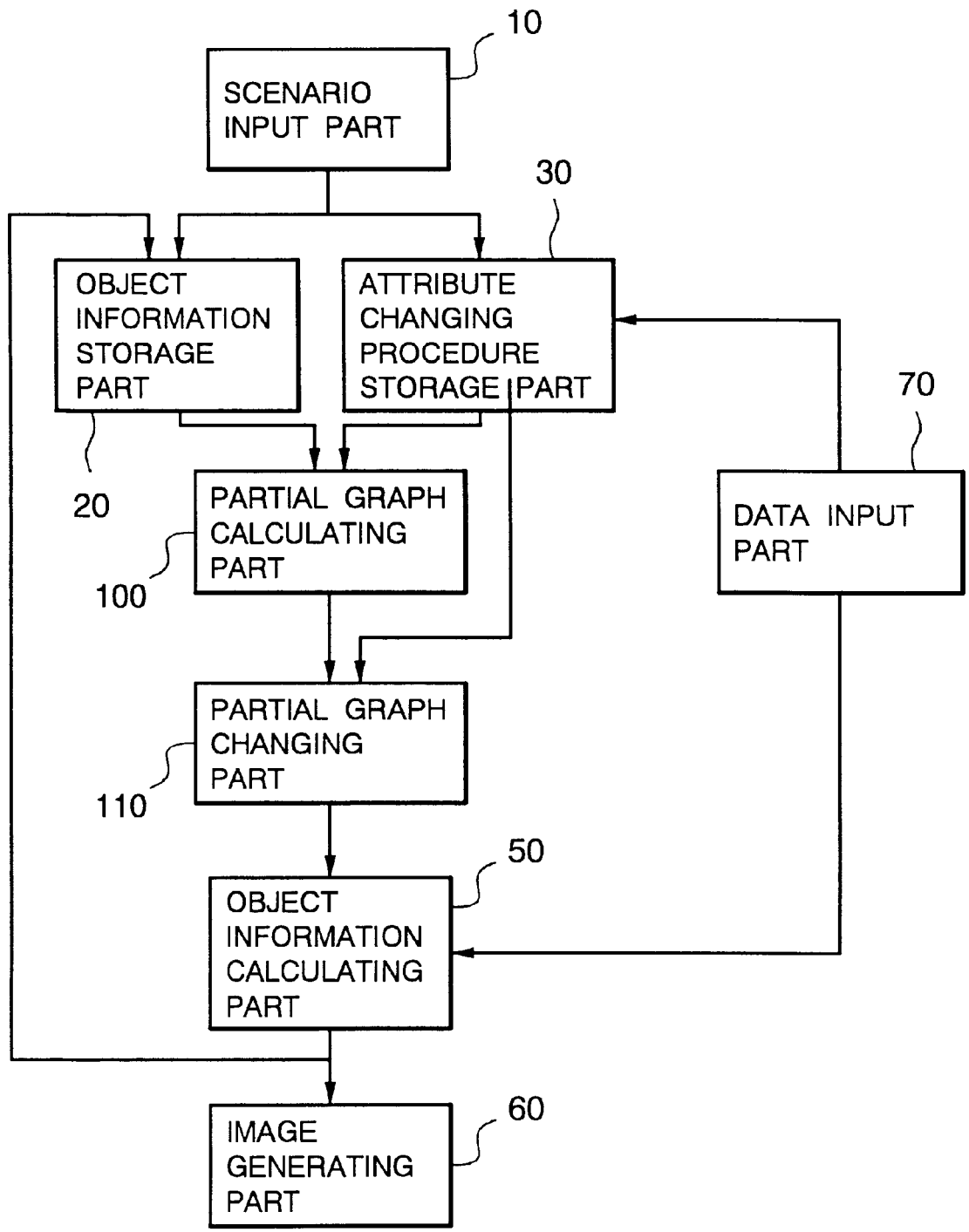
FIG. 8 a block diagram showing the structure of the fifth embodiment of the invention.

FIG. 8 is a block diagram showing the structure of an image presentation device according to the fifth embodiment of the invention.

As shown, the image presentation device of this embodiment comprises a scenario input part 10 for entering a scenario, an object information storage part 20 and an attribute changing procedure storage part 30 for storing the entered scenario, a partial graph calculating part 100 for calculating a partial graph according to information stored in the object information storage part 20 and the attribute changing procedure storage part 30, a partial graph changing part 110 for changing the partial graph according to the calculated results of the partial graph calculating part 100, an object information calculating part 50 for calculating the position of an object in a virtual space, an image generating part 60 for generating images according to the information processed in each part, and a data input part 70 for entering data by an interactive operation with a user.

The scenario entered from the scenario input part 10 has graph object information described as object information. The graph object information is stored in the object information storage part 20 in the same way as the ordinary object information in the first through fourth embodiments.

The graph object information is object information describing a plurality of objects which are connected into a hierarchical graph structure. The CG technology generally employs a method which connects a plurality of objects into a hierarchical structure to describe a complex image. This type of technology is disclosed in "COMPUTER GRAPHICS PRINCIPLES AND PRACTICE SECOND EDITION" (ADDISON WESLEY, 1990, pp 285–346, Foley, VanDam, Feiner, Hughes). This literature shows a method to generate an image by data which are described by connecting objects into a tree structure or a graph structure.

Figure 9:
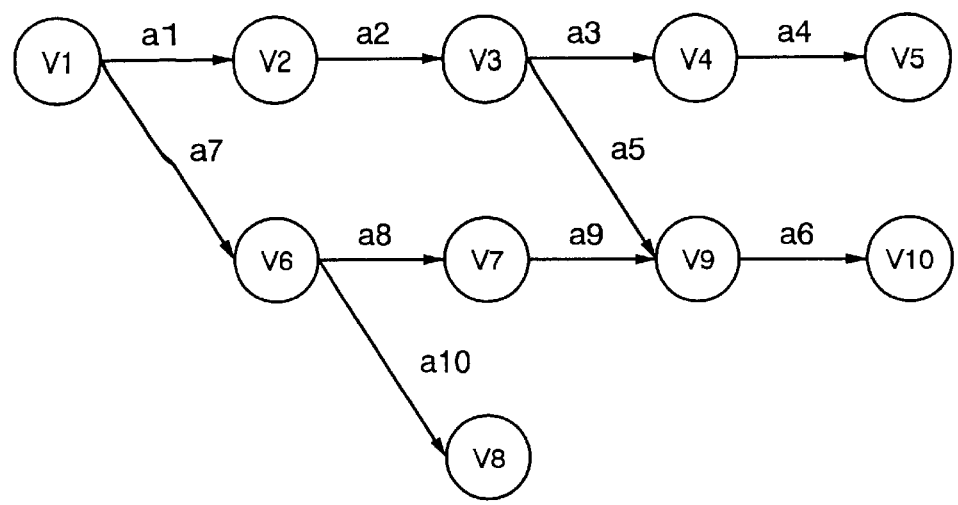
FIG. 9 is a diagram showing a structural example of graph object information used in the above embodiment.

This embodiment connects a plurality of object information into a hierarchical graph structure to generate a complex image. The graph object information having objects connected as a graph is described, for example, in a directed graph G=(V, A) without a closed circuit by determining the objects to be a vertex V=(v1, v2, . . . ) and motion information be an arc A=(a1, a2, . . . ). FIG. 9 shows one example of the directed graph without a closed circuit consisting of vertexes v1 to v10 and arcs a1 to a10.

As shown, the plurality of objects can be managed hierarchically by connecting the objects with each of them as the vertex of the directed graph. In the directed graph shown in FIG. 9, the vertex v1 is the highest-order root, the vertexes v5, v8 and v10 are the lowest-order leaves, and the remaining vertexes are hierarchically described between the highest-order root and the lowest-order leaves. The directed graph allows to have the partial graphs jointly, and the vertexes v3 and v7 jointly have the vertexes v9 and v10 as the low-order structure.

Connection of the plurality of vertexes can be described in a data structure known as the adjacent matrix or adjacent list of a graph, and this embodiment can use, e.g., the adjacent matrix of a graph as connection information.

Figure 11:
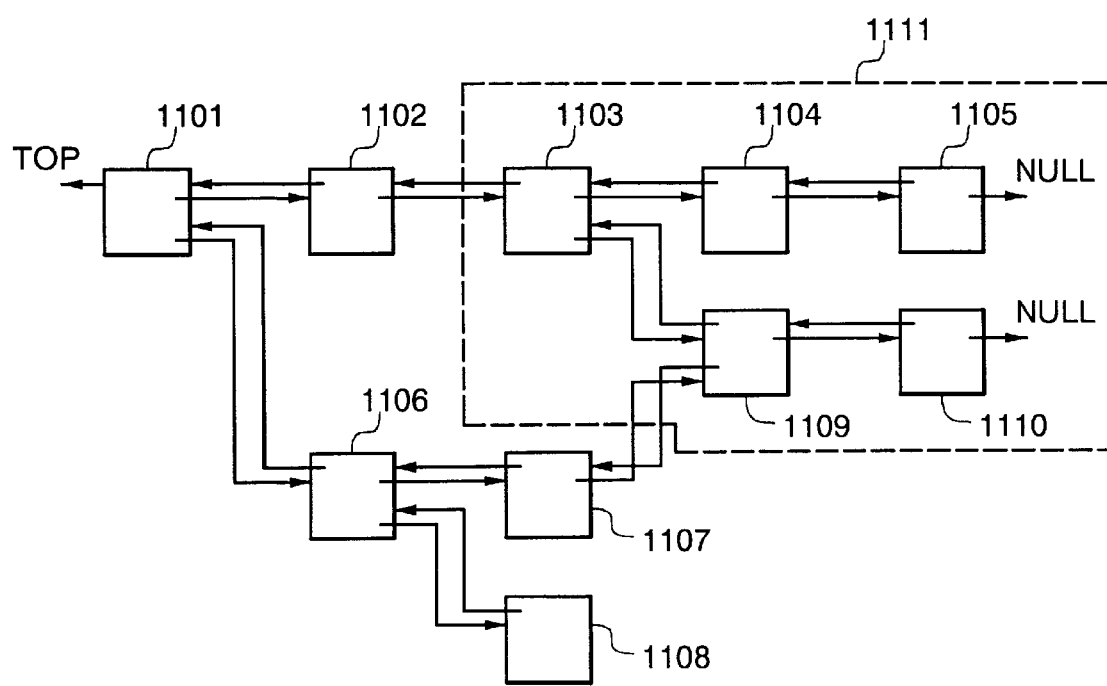
FIG. 11 is a diagram showing a structural example of the scenario in the above embodiment.
Figure 10:
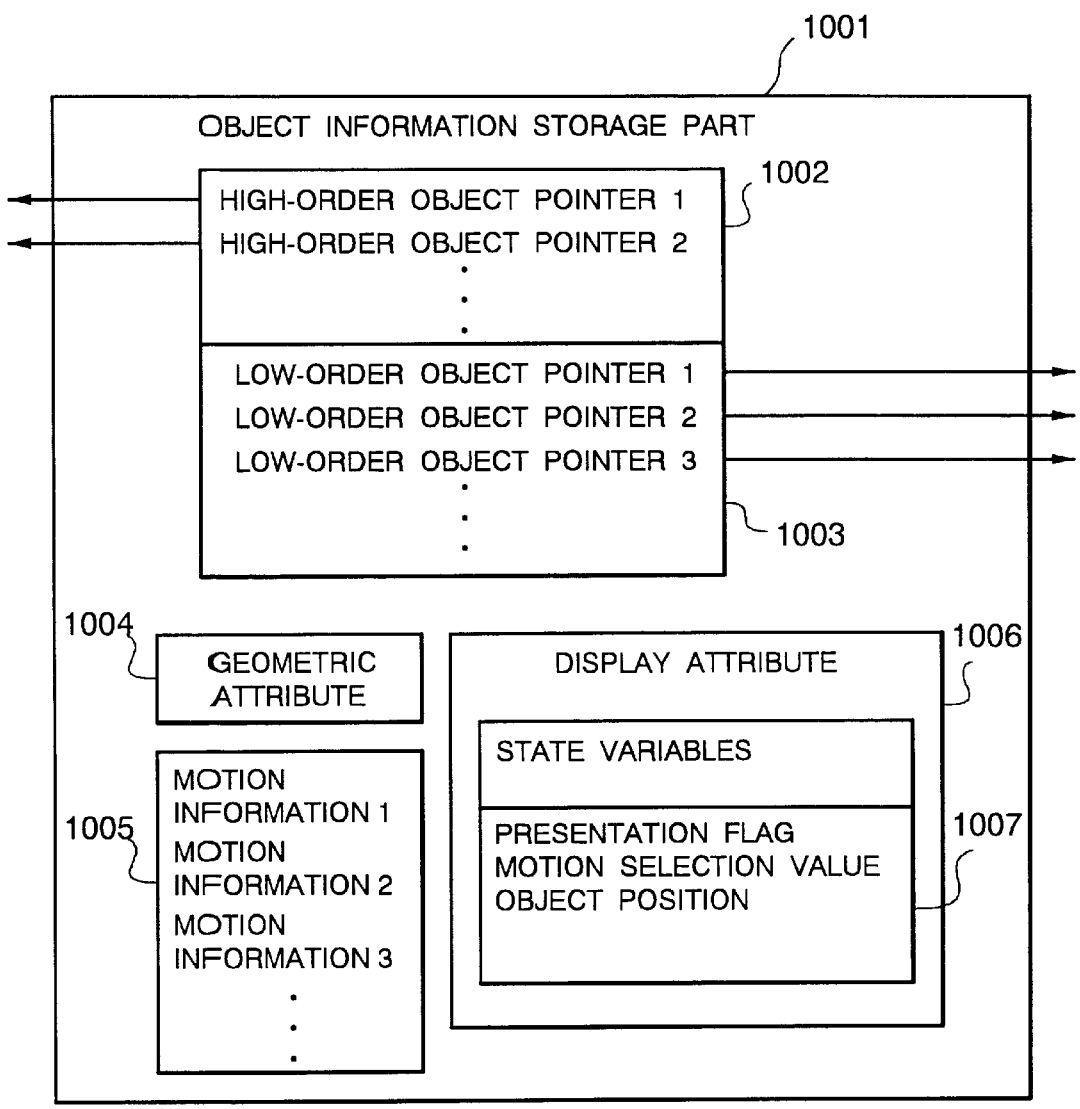
FIG. 10 is a diagram showing a structural example of object information used in the above embodiment.

As shown in FIG. 10, object information 1001 has high-order object pointers 1002 to be connected to high-order objects and low-order object pointers 1003 to be connected to low-order objects. FIG. 11 shows a scenario having the object information shown in FIG. 10 connected by the above two-way pointers. In FIG. 11, the low-order object pointers pointing from high order to low order correspond to the arcs of the graph of FIG. 9. And, the arrows pointing the left in the drawing designate the high-order object pointers, and those pointing the right designate the low-order object pointers. In this embodiment, the list consisting of the high-order object pointers and the low-order object pointers of the object information 1001 is the connection information.

The attribute changing procedure storage part 30 stores the connection information of the attribute changing procedure and the graph object information, and calculates the applicable attribute changing procedure according to the input data.

The applicable attribute changing procedure may be calculated in the same way as in the first to fourth embodiments. And, by not listing the elements of aggregate with respect to the object aggregate which is subject to the attribute change but designating as subject designation information an object representing the subject objects, calculation may be made to effect the corresponding attribute changing procedure. For example, when the attribute changing procedure is applied to a partial graph which is part of the whole graph, number of objects to be elements of the partial graph are not listed but the highest-order object of the partial graph is designated as the object designation information, and the objects belonging to the partial graph are calculated when changing the attributes to effect the applicable attribute changing procedure, thus the same processing as in the listing of the subject objects can be made. In FIG. 11, to designate a broken line area 1111 showing a partial graph, object No. of an object 1103 of the highest-order hierarchy in the broken line area 1111 is designated as subject designation information, and it is outputted as a set with a corresponding applicable attribute changing procedure.

To determine the subject designation information, the same method as used to designate an item in the attribute changing procedure storage part 30 of the first embodiment may be used. For example, connection information is presented as a graph to a user, and the user designates a vertex in the graph to determine the subject designation information.

The partial graph calculating part 100 is a program-controlled CPU or the like, and calculates a partial graph according to the subject designation information and the graph object information received from the object information storage part 20, marks object information contained in the partial graph. The marked object information is outputted as the partial graph object information to the partial graph changing part 110. For example, when a particular object in the graph is designated as the subject designation information, the partial graph calculating part 100 is determined by searching a partial graph having the designated object as the highest-order hierarchy by means of an algorithm such as a depth priority searching method. And, a mark corresponding to a type of an applicable attribute changing procedure is given to the object belonging to the partial graph for identification. A plurality of objects can also be designated as the subject designation information. In this case, the partial graph can be a union of the corresponding partial graphs, or a minimum partial graph containing respective objects as elements.

The partial graph changing part 110 is a program-controlled CPU or the like, and as to the marked object information in the partial graph object information, executes the corresponding applicable attribute changing procedure according to the mark to change the attribute and outputs as the changed object information.

As described above, when the object aggregate which is subject to the attribute changing procedure is designated by the subject designation information, designation can be made without listing each element of the aggregate even when designating the subject object aggregate according to the operation by the user.

Figure 12:
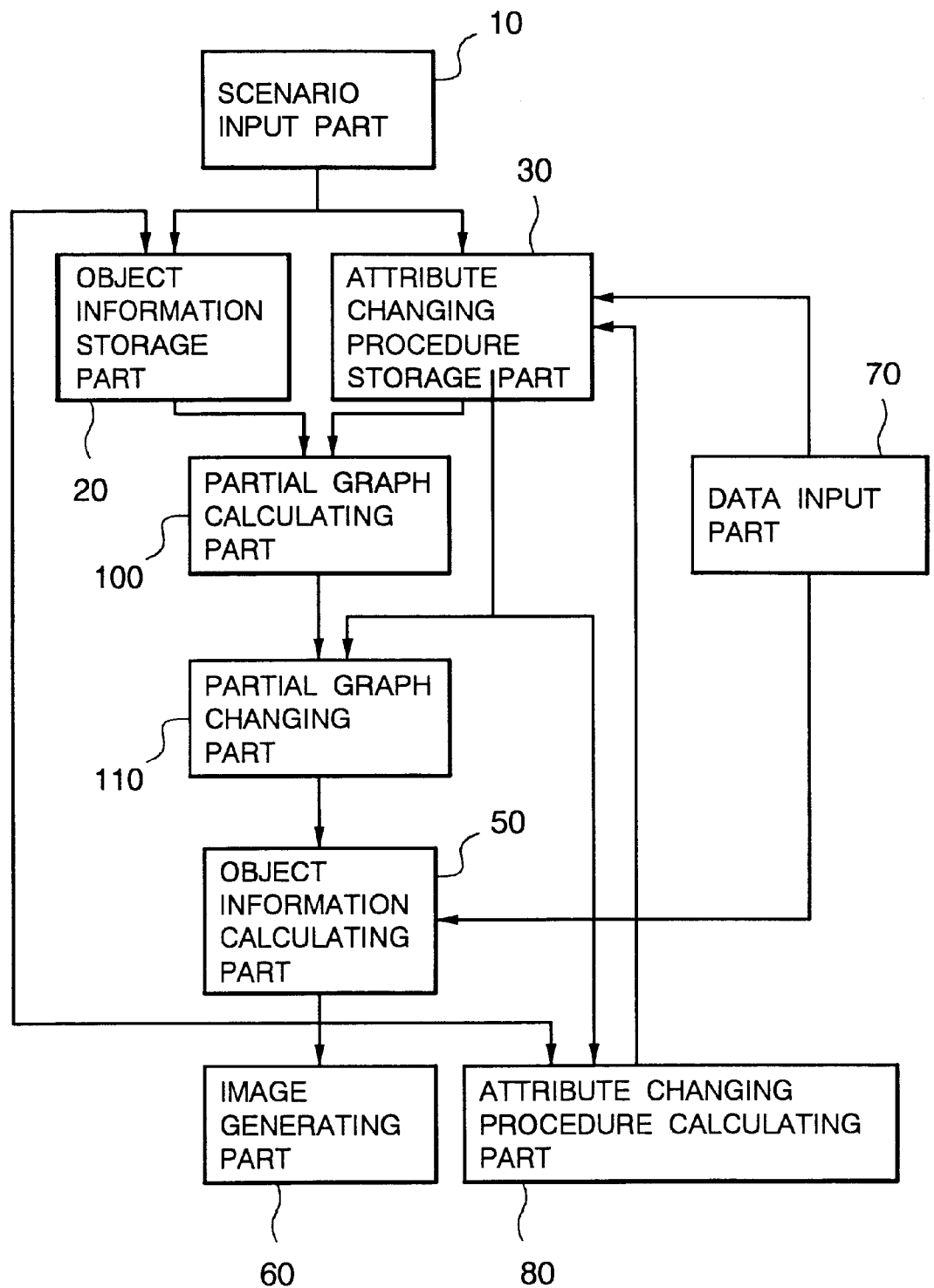
FIG. 12 is a block diagram showing the structure of the sixth embodiment of the invention.

FIG. 12 is a block diagram showing the structure of an image presentation device according to the sixth embodiment of the invention.

As shown, the image presentation device of this embodiment has an attribute changing procedure calculating part 80 added to the structure of the fifth embodiment shown in FIG. 8. The attribute changing procedure calculating part 80 is the same as the one in the second embodiment shown in FIG. 4. For other elements, the same reference numerals are assigned in the same way as in the fifth embodiment, and their descriptions will be omitted.

By automatically changing the attribute changing procedure according to the final object information from the object information calculating part 50, a method for presenting an object corresponding to a scene of the scenario can be selected.

Figure 13:
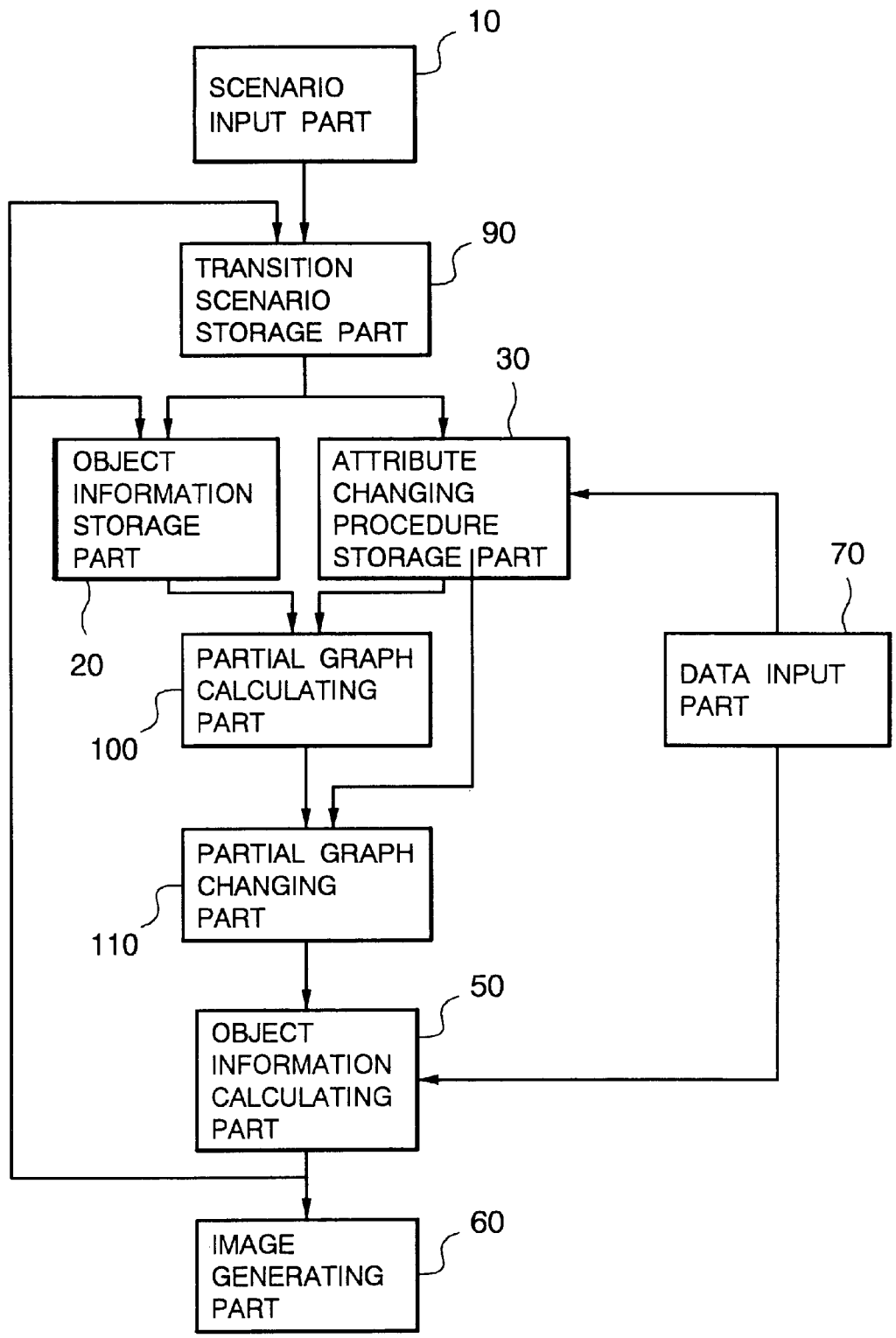
FIG. 13 is a block diagram showing the structure of the seventh embodiment of the invention.

FIG. 13 is a block diagram showing the structure of an image presentation device according to the seventh embodiment of the invention.

As shown, the image presentation device of this embodiment has a transition scenario storage part 90 added to the structure of the fifth embodiment shown in FIG. 8. The transition scenario storage part 90 is the same as the one in the third embodiment shown in FIG. 5. For other elements, the same reference numerals are assigned in the same way as in the fifth embodiment, and their descriptions will be omitted.

By storing a transition scenario entered into the transition scenario storage part 90 and sequentially switching the partial scenarios associated with the executed results of the scenario as described above, the large-scale transition scenario consisting of the partial scenarios can be executed.

Figure 14:
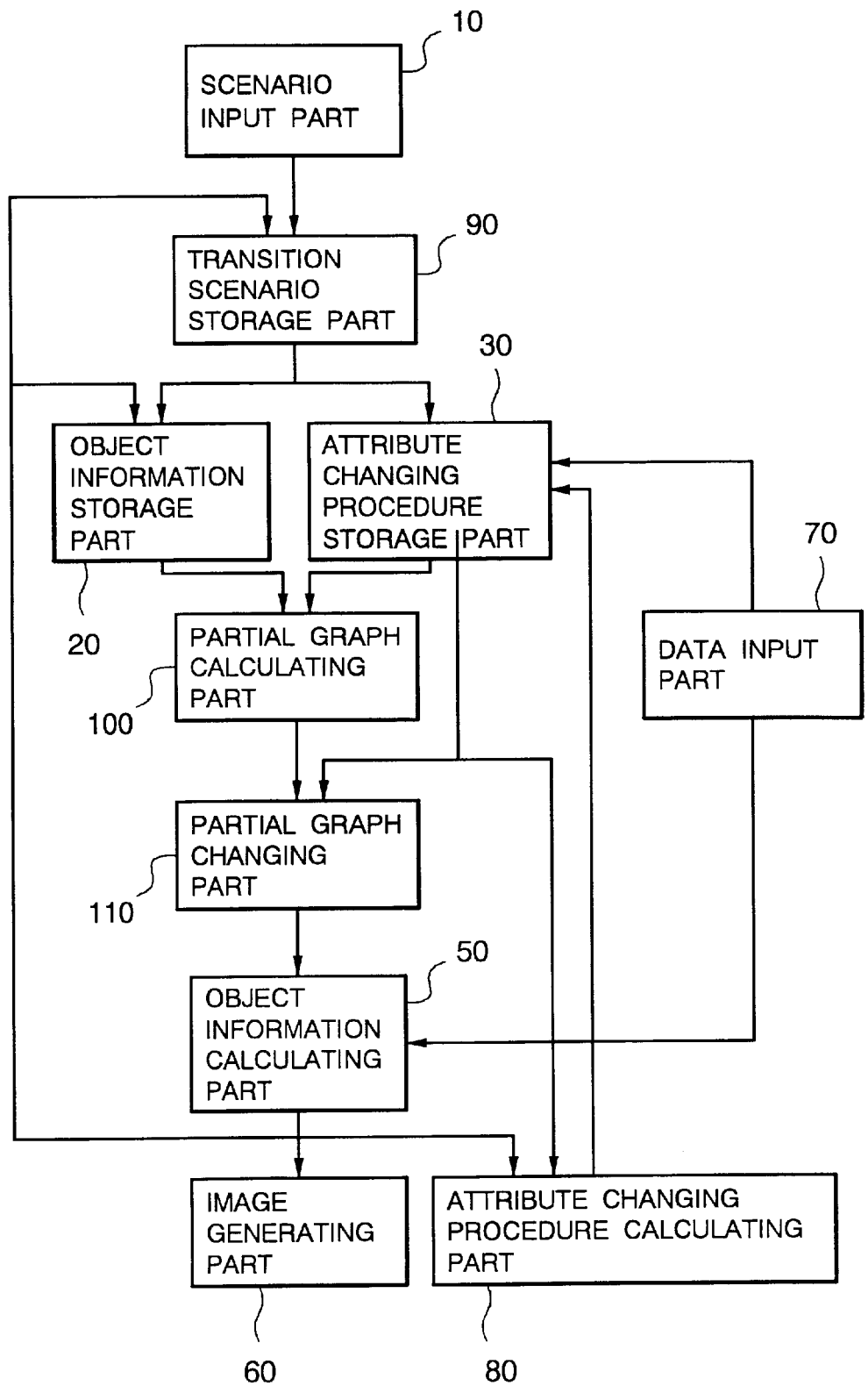
FIG. 14 is a block diagram showing the structure of the eighth embodiment of the invention.

FIG. 14 is a block diagram showing the structure of an image presentation device according to the seventh embodiment of the invention.

As shown, the image presentation device of this embodiment has an attribute changing procedure calculating part 80 and a transition scenario storage part 90 added to the structure of the fifth embodiment shown in FIG. 8. The attribute changing procedure calculating part 80 is the same as the one in the second embodiment shown in FIG. 4. The transition scenario storage part 90 is the same as the one in the third embodiment shown in FIG. 5. For other elements, the same reference numerals are assigned in the same way as in the first embodiment, and their descriptions will be omitted.

By virtue of the attribute changing procedure calculating part 80, this embodiment can automatically change the attribute changing procedure according to the final object information from the object information calculating part 50, and can select a method for presenting an object corresponding to a scene of the scenario.

And, by storing a transition scenario entered into the transition scenario storage part 90 and sequentially switching the partial scenarios associated with the executed results of the scenario, the large-scale transition scenario consisting of the partial scenarios can be executed.

As described above, the image presentation device of the invention describes a scenario by a set of the object information and the attribute changing procedure, and applies the attribute changing procedure to the object information when executing the scenario, thereby sequentially generating scene data corresponding to the display/non-display of the objects and the presentation states such as the motion of the objects to create an image. Thus, for an object which has a plurality of presentation states, it is not necessary to previously provide a plurality of scene data, facilitating the generation of a scenario.

Besides, when a user changes the attribute changing procedure, a presentation state corresponding to the user's will can be immediately generated and presented. At this time, some object aggregates are calculated and automatically taken out, and the attribute changing procedure is effected on the taken-out objects, so that it is not necessary to list the objects which become respective elements comprising the object aggregate, facilitating the operations such as the designation of presenting the objects by the user.

Furthermore, since the generation is sequentially made according to the operations by the user without previously providing the scene data, scenes can be developed freely as the user desires.

When the object information is changed during the generation of a scenario to generate a plurality of presentation states according to a single piece of object information, the changes are automatically reflected to all scene data. Thus, the same changes are not required to be made repeatedly for the plurality of scene data, reducing works required for generating the scenario data.

By combining independent partial scenario data for each scene as a story develops or for each partial space forming the space and connecting them by the link information to describe single scenario data as the whole and to execute it, even large-scale and complicated scenario data can be produced from relatively simple partial scenarios and the work is facilitated.

Furthermore, the production of each partial scenario can be made by a plurality of scenario creators, and workability is improved.

Although the invention has been illustrated and described with respect to exemplary embodiments thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodied within a scope encompassed and equivalents thereof with respect to the features set out in the appended claims.

What is claimed is:

1. An image presentation device for producing a display including an object, comprising:

object information storage means for storing object information representing attributes of an object and a position of the object in a virtual space;

attribute changing procedure storage means for storing attribute changing procedures associated with the object;

attribute changing procedure selection means for selecting, in accordance with input from a user of the image presentation system, attribute changing procedures for application to the object;

attribute changing means for changing object information representing attributes of the object through application of selected attribute changing procedures to the object information;

position changing means for changing object information representing a position of the object in the virtual space in accordance with object information changed by the attribute changing means;

image generating means for generating an image of the object in accordance with the object information; and object information renewing means for renewing stored object information by feeding back to the object information storage means object information changed by the attribute changing means and position changing means.

2. An image presentation device as set forth in claim 1, further comprising attribute changing procedure renewing means for renewing attribute changing procedures stored in the attribute changing procedure storage means in accordance with operations by a user.

3. An image presentation device as set forth in claim 1, further comprising:

attribute changing procedure renewing means for renewing attribute changing procedures stored in the attribute changing procedure storage means in accordance with operations by a user; and object information renewing means for renewing stored object information by feeding back to the object information storage means object information changed by the attribute changing means and position changing means.

4. An image presentation device as set forth in claim 1, wherein the object information contains a geometric attribute describing information pertaining to a shape of at least each appearing object, a motion attribute describing information pertaining to the motion of the appearing object, and a display attribute describing information pertaining to the display state of the appearing object.

5. An image presentation device as set forth in claim 4, wherein the display attribute contains as state variables at least a presentation flag indicating a difference between visible and invisible states, information indicating which one of a plurality of motions is to be executed, and information indicating a position of the appearing object in the virtual space.

6. An image presentation device as set forth in claim 3, further comprising attribute changing procedure changing means for changing attribute changing procedures stored in the attribute changing procedure storage means in accordance with object information changed by the position changing means.

7. An image presentation device according to claim 6, wherein the object information contains a geometric attribute describing information pertaining to a shape of at least each appearing object, a motion attribute describing information pertaining to the motion of the appearing object, and a display attribute describing information pertaining to the display state of the appearing object, and wherein the display attribute contains as state variables at least a presentation flag indicating a difference between visible and invisible states, information indicating which one of a plurality of motions is to be executed, and information indicating a position of the appearing object in the virtual space.

8. An image presentation device as set forth in claim 3, further comprising transition scenario storage means for receiving and storing a transition scenario which describes a combination of partial scenarios and link information among the partial scenarios, and for outputting the partial scenarios, according to the execution state of the scenario, to the object information storage means and the attribute changing procedure storage means.

9. An image presentation device as set forth in claim 8, wherein the object information contains a geometric attribute describing information pertaining to a shape of at least each appearing object, a motion attribute describing information pertaining to the motion of the appearing object, and a display attribute describing information pertaining to the display state of the appearing object, and wherein the display attribute contains as state variables at least a presentation flag indicating a difference between visible and invisible states, information indicating which one of a plurality of motions is to be executed, and information indicating a position of the appearing object in the virtual space.

10. An image presentation device as set forth in claim 3, further comprising:

attribute changing procedure changing means for changing attribute changing procedures stored in the attribute changing procedure storage means in accordance with object information changed by the position changing means; and transition scenario storage means for receiving and storing a transition scenario which describes a combination of partial scenarios and link information among the partial scenarios, and for outputting the partial scenarios according to the execution state of the scenario to the object information storage means and the attribute changing procedure storage means.

11. An image presentation device according to claim 10, wherein the object information contains a geometric attribute describing information pertaining to a shape of at least each appearing object, a motion attribute describing information pertaining to the motion of the appearing object, and a display attribute describing information pertaining to the display state of the appearing object, and wherein the display attribute contains as state variables at least a presentation flag indicating a difference between visible and invisible states, information indicating which one of a plurality of motions is to be executed, and information indicating a position of the appearing object in the virtual space.

12. An image presentation device for producing a display including an object, comprising:

object information storage means for storing object information representing a hierarchical graph structure of objects and attributes of the objects;

attribute changing procedure storage means for storing attribute changing procedures associated with the objects;

attribute changing procedure selection means for selecting, in accordance with input from a user of the image presentation system, attribute changing procedures for application to the object;

partial graph specifying means for specifying a partial graph of the objects in accordance with the object information and a selected attribute changing procedure;

attribute changing means for changing object information representing a specified partial graph in accordance with the selected attribute changing procedure;

position changing means for changing object information representing a position of the selected partial graph in a virtual space in accordance with object information changed by the attribute changing means;

image generating means for generating an image of the object in accordance with the object information; and object information renewing means for renewing stored object information by feeding back to the object information storage means object information changed by the attribute changing means and position changing means.

13. An image presentation device as set forth in claim 12, further comprising attribute changing procedure renewing means for renewing attribute changing procedures stored in the attribute changing procedure storage means in accordance with operations by a user.

14. An image presentation device as set forth in claim 12, further comprising:

attribute changing procedure renewing means for renewing attribute changing procedures stored in the attribute changing procedure storage means in accordance with operations by a user; and object information renewing means for renewing stored object information by feeding back to the object information storage means object information changed by the attribute changing means and position changing means.

15. An image presentation device as set forth in claim 12, wherein the object information contains a geometric attribute describing information pertaining to a shape of at least each appearing object, a motion attribute describing information pertaining to the motion of the appearing object, and a display attribute describing information pertaining to the display state of the appearing object.

16. An image presentation device as set forth in claim 14, wherein the display attribute contains as state variables at least a presentation flag indicating a difference between visible and invisible states, information indicating which one of a plurality of motions is to be executed, and information indicating a position of the appearing object in the virtual space.

17. An image presentation device as set forth in claim 12, further comprising attribute changing procedure changing mean for changing attribute changing procedures stored in the attribute changing procedure storage means in accordance with object information changed by the position changing means.

18. An image presentation device as set forth in claim 16, wherein the object information contains a geometric attribute describing information pertaining to a shape of at least each appearing object, a motion attribute describing information pertaining to the motion of the appearing object, and a display attribute describing information pertaining to the display state of the appearing object, and wherein the display attribute contains as state variables at least a presentation flag indicating a difference between visible and invisible states, information indicating which one of a plurality of motions is to be executed, and information indicating a position of the appearing object in the virtual space.

19. An image presentation device as set forth in claim 12, further comprising transition scenario storage means for receiving and storing a transition scenario which describes a combination of partial scenarios and link information among the partial scenarios, and for outputting the partial scenarios according to the execution state of the scenario to the object information storage means and the attribute changing procedure storage means.

20. An image presentation device as set forth in claim 19, wherein the object information contains a geometric attribute describing information pertaining to a shape of at least each appearing object, a motion attribute describing information pertaining to the motion of the appearing object, and a display attribute describing information pertaining to the display state of the appearing object, and wherein the display attribute contains as state variables at least a presentation flag indicating a difference between visible and invisible states, information indicating which one of a plurality of motions is to be executed, and information indicating a position of the appearing object in the virtual space.

21. An image presentation device as set forth in claim 12, further comprising:

attribute changing procedure changing means for changing attribute changing procedures stored in the attribute changing procedure storage means in accordance with object information changed by the position changing means; and transition scenario storage means for receiving and storing a transition scenario which describes a combination of partial scenarios and link information among the partial scenarios, and for outputting the partial scenarios according to the execution state of the scenario to the object information storage means and the attribute changing procedure storage means.

22. An image presentation device as set forth in claim 21, wherein the object information contains a geometric attribute describing information pertaining to a shape of at least each appearing object, a motion attribute describing information pertaining to the motion of the appearing object, and a display attribute describing information pertaining to the display state of the appearing object, and wherein the display attribute contains as state variables at least a presentation flag indicating a difference between visible and invisible states, information indicating which one of a plurality of motions is to be executed, and information indicating a position of the appearing object in the virtual space.

\* \* \* \* \*